US012782590B2

(12) United States Patent
Wu

(10) Patent No.: US 12,782,590 B2
(45) Date of Patent: Nov. 3, 2026

(54) ELECTRONIC DEVICE HAVING A SCINTILLATOR LAYER AND A MANUFACTURING METHOD THEREOF

(71) Applicant: InnoCare Optoelectronics Corporation, Tainan (TW)

(72) Inventor: Chih-Hao Wu, Tainan (TW)

(73) Assignee: InnoCare Optoelectronics Corporation, Tainan City (TW)

( * ) Notice: Subject to any disclaimer, the term of this patent is extended or adjusted under 35 U.S.C. 154(b) by 126 days.

(21) Appl. No.: 18/991,706

(22) Filed: Dec. 23, 2024

(65) Prior Publication Data

US 2025/0291073 A1 Sep. 18, 2025

(30) Foreign Application Priority Data

Mar. 12, 2024 (TW) ................................ 113108949

(51) Int. Cl.
*G01T 1/20* (2006.01)
*G01T 1/202* (2006.01)

(52) U.S. Cl.
CPC .......... *G01T 1/20187* (2020.05); *G01T 1/202* (2013.01)

(58) Field of Classification Search
CPC ............................ G01T 1/20187; G01T 1/202
See application file for complete search history.

(56) References Cited

U.S. PATENT DOCUMENTS 7,692,156 B1 4/2010 Nagarkar
2002/0070343 A1* 6/2002 Hoffman ............... G01T 1/2985 250/367
2004/0016885 A1* 1/2004 Ikhlef ..................... G01T 1/202 250/363.02
2012/0193543 A1* 8/2012 Kaneko ................... G01T 1/202 250/369

FOREIGN PATENT DOCUMENTS

CN 108461513 7/2021
KR 20190141509 12/2019

* cited by examiner

*Primary Examiner* — Kiho Kim
(74) *Attorney, Agent, or Firm* — JCIPRNET

(57) ABSTRACT

An electronic device including an element array substrate, multiple protrusions, and a scintillator layer is provided. The element array substrate includes multiple photosensitive elements. The protrusions are disposed on the photosensitive elements and are separated from each other. The scintillator layer is disposed on the protrusions, wherein the scintillator layer has a first portion overlapping with the protrusions and a second portion not overlapping with the protrusions, and a side of the second portion layer adjacent to the element array substrate is looser than a side of the second portion away from the element array substrate. A manufacturing method of the electronic device is also provided.

20 Claims, 7 Drawing Sheets

ELECTRONIC DEVICE HAVING A SCINTILLATOR LAYER AND A MANUFACTURING METHOD THEREOF

CROSS-REFERENCE TO RELATED APPLICATION

This application claims the priority benefit of Taiwan application serial no. 113108949, filed on Mar. 12, 2024. The entirety of the above-mentioned patent application is hereby incorporated by reference herein and made a part of this specification.

BACKGROUND

Technical Field

The disclosure relates to an electronic device and a manufacturing method thereof, and in particular to an electronic device having a scintillator layer and a manufacturing method thereof.

Description of Related Art

As the development of electronic devices becomes more and more mature, how to further improve the performance (such as improving the spatial resolution or the sensitivity of imaging) of the electronic devices has become one of the current research and development focuses.

SUMMARY

The disclosure provides an electronic device and a manufacturing method thereof, which can help improve the spatial resolution or the sensitivity of imaging.

In an embodiment of the disclosure, an electronic device includes an element array substrate, multiple protrusions, and a scintillator layer. The element array substrate includes multiple photosensitive elements. The protrusions are disposed on the photosensitive elements and are separated from each other. The scintillator layer is disposed on the protrusions. The scintillator layer has a first portion overlapping with the protrusions and a second portion not overlapping with the protrusions, and a side of the second portion adjacent to the element array substrate is looser than a side of the second portion away from the element array substrate.

In an embodiment of the disclosure, a manufacturing method of an electronic device includes the following steps. An element array substrate is provided. The element array substrate includes multiple photosensitive elements. Multiple protrusions are formed on the element array substrate. The protrusions are disposed on the photosensitive elements and are separated from each other. A scintillator layer is formed on the protrusions. The scintillator layer has a first portion overlapping with the protrusions and a second portion not overlapping with the protrusions, and a side of the second portion adjacent to the element array substrate is looser than a side of the second portion away from the element array substrate.

In order for the features and advantages of the disclosure to be more comprehensible, the following specific embodiments are described in detail in conjunction with the drawings.

BRIEF DESCRIPTION OF THE DRAWINGS

The drawings are included to provide a further understanding of the disclosure, and the drawings are incorporated into the specification and constitute a part of the specification. The drawings illustrate embodiments of the disclosure and serve to explain principles of the disclosure together with the description.

DESCRIPTION OF THE EMBODIMENTS

Figure 1:
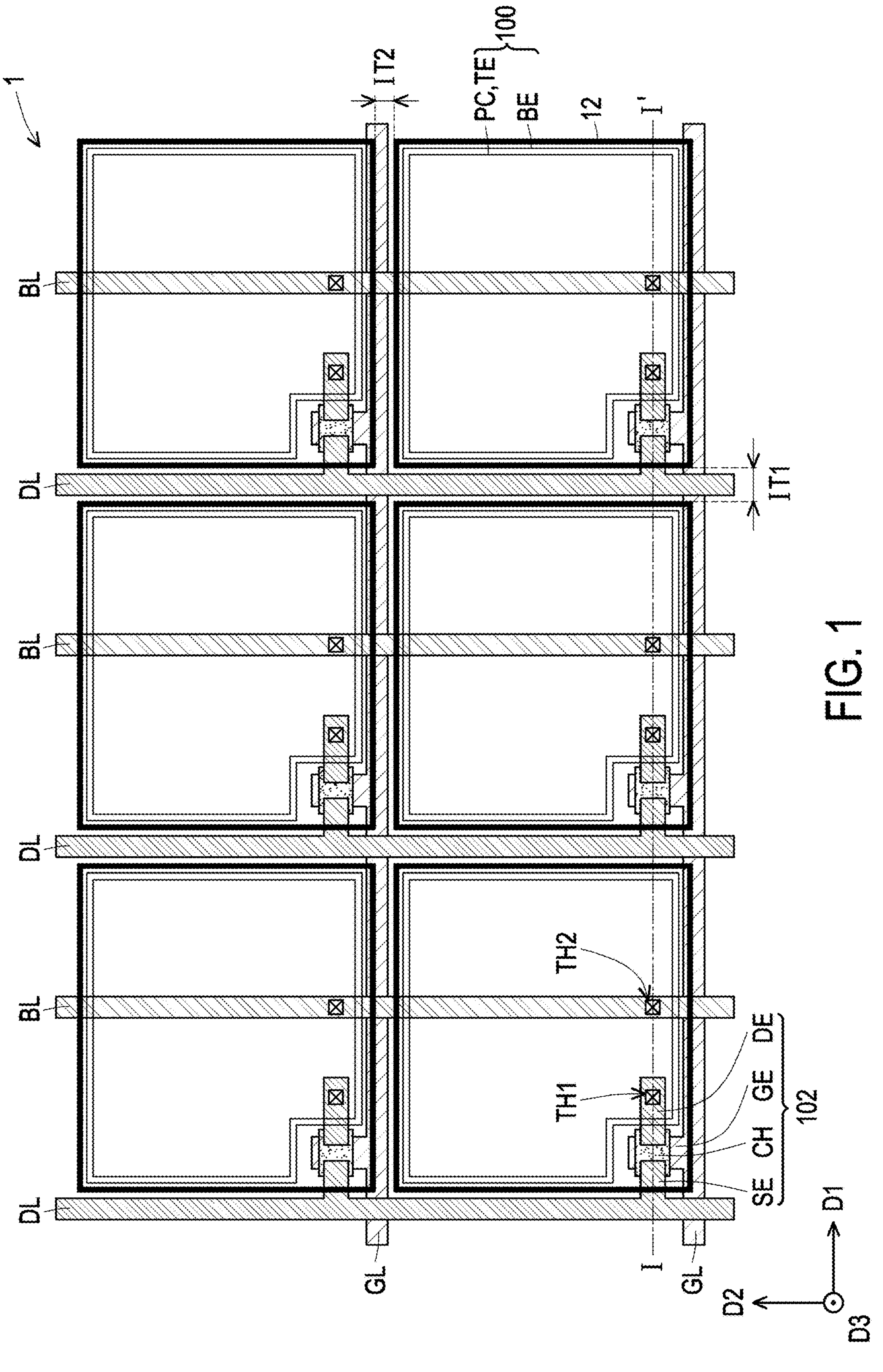
FIG. 1 is a partial top schematic view of an electronic device according to an embodiment of the disclosure.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Throughout the specification and the appended claims of the disclosure, certain terms may be used to refer to specific elements. It should be understood by persons skilled in the art that electronic device manufacturers may refer to the same element by different names. The disclosure does not intend to distinguish between elements with the same function but different names. In the following specification and claims, words such as “containing” and “comprising” are open-ended words, so the words should be interpreted as “including but not limited to . . . ”.

Directional terms such as “top”, “bottom”, “front”, “rear”, “left”, and “right” mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

When a structure (or layer, element, or base) is described in the disclosure as being located on/above another structure (or layer, element, or base), it may mean that the two structures are adjacent and directly connected or it may mean that the two structures are adjacent but not directly connected. Indirect connection means that there is at least one intermediate structure (or intermediate layer, intermediate element, intermediate base, or intermediate spacing) between the two structures. A lower surface of one structure is adjacent or directly connected to an upper surface of the intermediate structure, and an upper surface of the other structure is adjacent or directly connected to a lower surface of the intermediate structure. The intermediate structure may be composed of a single-layer or multi-layer physical structure or non-physical structure, but not limited thereto. In the disclosure, when a certain structure is disposed “on” another structure, it may mean that the certain structure is "directly" on the other structure or it may mean that the certain structure is "indirectly" on the other structure, that is, at least one structure is also sandwiched between the certain structure and the other structure.

The terms "about", "substantially", or "approximately" are generally interpreted as within 10% of a given value or range, or interpreted as within 5%, 3%, 2%, 1%, or 0.5% of the given value or range. In addition, the terms "a range is from a first value to a second value" and "the range is between the first value and the second value" mean that the range includes the first value, the second value, and other values therebetween.

Ordinal numbers such as "first" and "second" used in the specification and the claims are used to modify elements and do not imply and represent that the elements have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first component in the specification may be a second component in the claims.

In some embodiments of the disclosure, terms such as "connection" and "interconnection" related to bonding and connection, unless otherwise specified, may mean that two structures are in direct contact, or may also mean that the two structures are not in direct contact, wherein there is another structure between the two structures. Also, the terms related to bonding and connection may also include the case where the two structures are both movable or the two structures are both fixed. In addition, the term "coupling" includes any direct and indirect means of electrical connection. In addition, the term "link" includes a means of signal communication whereby two elements or devices may directly or indirectly receive and/or transmit wireless signals.

Electrical connection or coupling described in the disclosure may refer to both direct connection or indirect connection. In the case of direct connection, end points of elements on two circuits are directly connected or connected to each other with a conductor segment, and in the case of indirect connection, there is a switch, a diode, a capacitor, an inductor, a resistor, other suitable elements, or a combination of the above elements between the end points of the elements on the two circuits, but not limited thereto.

In the disclosure, the measurement manner of thickness, length, and width may be by adopting an optical microscope (OM), and the thickness or the width may be obtained by measuring a cross-sectional image in an electron microscope, but not limited thereto. In addition, there may be a certain error in any two values or directions for comparison. In addition, the term "a given range is from a first value to a second value", "the given range falls within a range of the first value to the second value", or "the given range is between the first value and the second value" means that the given range includes the first value, the second value, and other values therebetween. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

It should be noted that in the following embodiments, the features in several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms such as the terms defined in commonly used dictionaries should be interpreted as having meanings consistent with the relevant art and the background or context of the disclosure, and should not be interpreted in an idealized or overly formal manner, unless otherwise defined in the embodiments of the disclosure.

In the disclosure, the type and the form of an electronic device are not limited. For example, the electronic device may include a display device, a backlight device, an antenna device, a detection device, a splicing device, or any device that requires charging. In addition, the electronic device may be a bendable or flexible electronic device. The display device may be a non-self-luminous display device or a self-luminous display device. The electronic device may, for example, include liquid crystal, a light emitting diode, fluorescence, phosphor, quantum dot (QD), other suitable display media, or a combination of the above. The antenna device may be a liquid crystal antenna device or a non-liquid crystal antenna device. The detection device may be a detection device for sensing capacitance, light rays (for example, visible light or X-rays), thermal energy, or ultrasonic waves, but not limited thereto. In some embodiments, the electronic device may include an electronic element. The electronic element may include a passive element and an active element, such as a capacitor, a resistor, an inductor, a diode, and a transistor. The diode may include a light emitting diode or a photodiode. The light emitting diode may include, for example, an organic light emitting diode (OLED), a mini LED, a micro LED, or a quantum dot LED, but not limited thereto. The splicing device may be, for example, a display splicing device, a detection splicing device, or an antenna splicing device, but not limited thereto.

It should be noted that the electronic device may be any permutation and combination of the above, but not limited thereto. In addition, the shape of the electronic device may be rectangular, circular, polygonal, a shape with curved edges, or other suitable shapes. The electronic device may have a peripheral system such as a driving system, a control system, and a light source system to support the display device, the antenna device, a wearable device (for example, including augmented reality or virtual reality), a vehicle-mounted device (for example, including a car windshield), the splicing device, etc.

Figure 2:
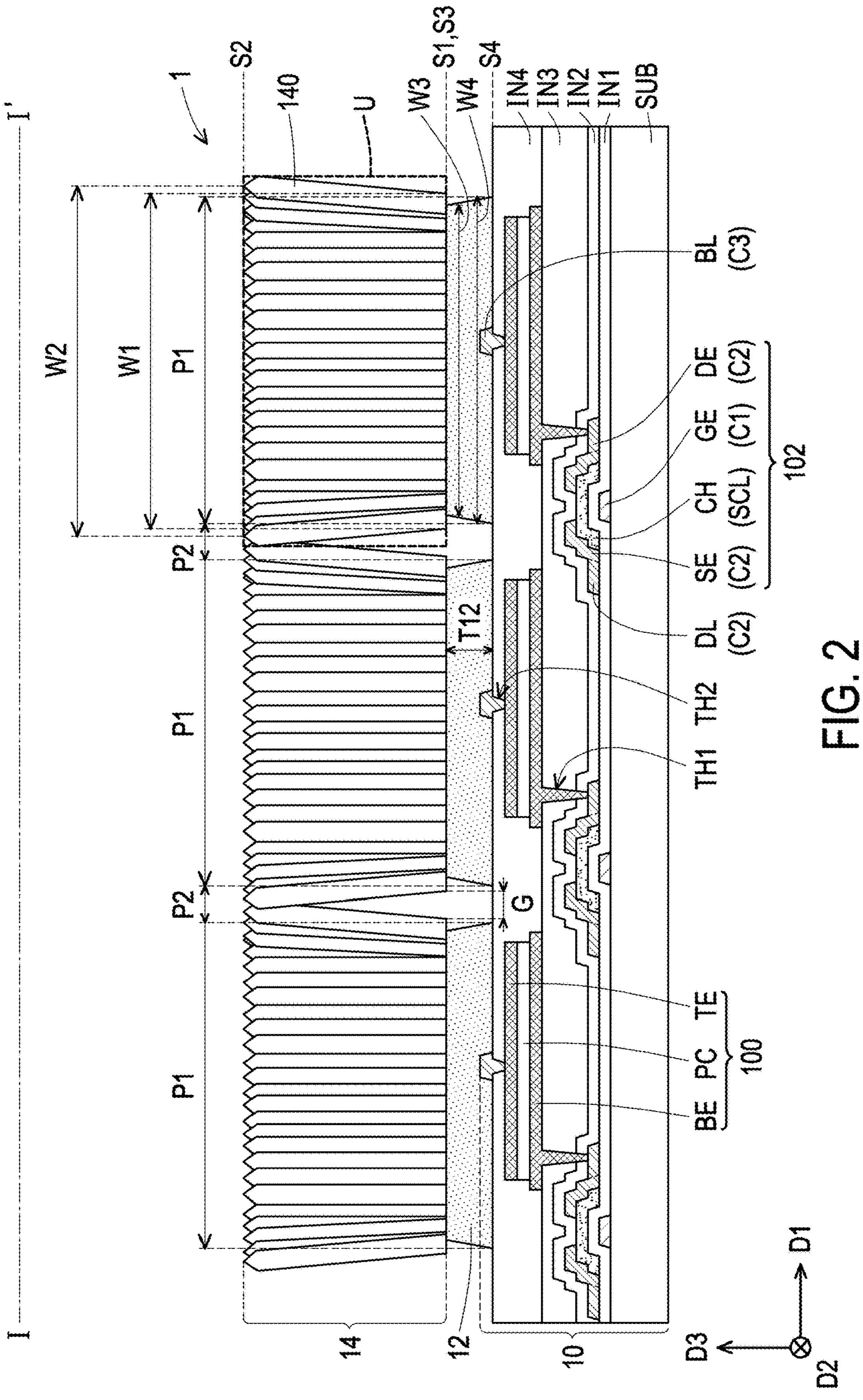
FIG. 2 is a cross-sectional schematic view corresponding to a section line I-I' in FIG. 1.

FIG. 1 is a partial top schematic view of an electronic device according to an embodiment of the disclosure. FIG. 2 is a cross-sectional schematic view corresponding to a section line I-I' in FIG. 1. In FIG. 1, in order to clearly show the relative arrangement relationships between multiple protrusions and other elements (for example, multiple photosensitive elements, multiple active elements, multiple gate lines, multiple scan lines, and multiple bias lines), some film layers (for example, a scintillator layer, multiple dielectric layers, etc.) in the electronic device are omitted from illustration. For the omitted film layers, please refer to FIG. 2 and the related descriptions thereof. In addition, in order to facilitate identification, FIG. 1 marks the edges of the protrusions with thick lines and omits the shading of the protrusions to clearly show elements located below the protrusions.

Please refer to FIG. 1 and FIG. 2. An electronic device 1 may include an element array substrate 10, multiple protrusions 12, and a scintillator layer 14. The element array substrate 10 may include multiple photosensitive elements 100. The protrusions 12 are disposed on the photosensitive elements 100 and are separated from each other. The scintillator layer 14 is disposed on the protrusions 12, wherein the scintillator layer 14 has a first portion P1 overlapping with the protrusions 12 and a second portion P2 not overlapping with the protrusions 12, and a side (for example, the lower side) of the second portion P2 adjacent to the element array substrate 10 is looser than a side (for example, the upper side) of the second portion P2 away from the element array substrate 10.

Specifically, the protrusions 12 and the scintillator layer 14 are, for example, sequentially disposed on the element array substrate 10 along a direction D3. Taking FIG. 2 as an example, the element array substrate 10 may include a substrate SUB, a conductive layer C1, a dielectric layer IN1, a semiconductor layer SCL, a conductive layer C2, a dielectric layer IN2, a dielectric layer IN3, the photosensitive elements 100, a dielectric layer IN4, and a conductive layer C3, but not limited thereto. According to different requirements, one or more film layers may be added to or removed from the element array substrate 10.

The substrate SUB may be a hard substrate or a flexible substrate. The material of the substrate SUB includes, for example, glass, quartz, ceramics, sapphire, plastic, etc., but not limited thereto. The plastic may include polycarbonate (PC), polyimide (PI), polypropylene (PP), polyethylene terephthalate (PET), other suitable flexible materials, or a combination of the above materials, but not limited thereto.

The conductive layer C1 is disposed on the substrate SUB. The material of the conductive layer C1 includes, for example, a transparent conductive material or an opaque conductive material. The transparent conductive material may include metal oxide, graphene, other suitable transparent conductive materials, or a combination of the above. The metal oxide may include indium tin oxide, indium zinc oxide, aluminum tin oxide, aluminum zinc oxide, indium germanium zinc oxide, or other metal oxides. The opaque conductive material may include a metal, an alloy, or a combination of the above. The metal may be a single-layer metal or a metal stack, such as aluminum, molybdenum, or titanium/aluminum/titanium, but not limited thereto. The conductive layer C1 may be a patterned conductive layer, and the conductive layer C1 may include multiple gates GE, multiple gate lines GL (refer to FIG. 1), and other lines (not shown), but not limited thereto.

As shown in FIG. 1, each gate GE is electrically connected to a corresponding gate line GL. The gate lines GL extend, for example, along a direction D1 and are arranged along a direction D2. The direction D1 and the direction D2 intersect each other and are both perpendicular to a stacking direction (for example, the direction D3) of the element array substrate 10, the protrusions 12, and the scintillator layer 14. In some embodiments, the direction D1 and the direction D2 are perpendicular to each other, but not limited thereto.

Please refer to FIG. 2 again. The dielectric layer IN1 is disposed on the conductive layer C1 and the substrate SUB. The dielectric layer IN1 may be a single layer or multiple layers. The material of the dielectric layer IN1 includes, for example, an organic insulating material, an inorganic insulating material, or a combination of the above. The organic insulating material includes, for example, polymethylmethacrylate (PMMA), epoxy, acrylic-based resin, silicone, polyimide polymer, polyfluoroalkoxy (PFA), or a combination of the above, but not limited thereto. The inorganic insulating material includes, for example, silicon oxide, silicon nitride, silicon oxynitride, or a combination of the above, but not limited thereto.

The semiconductor layer SCL is disposed on the dielectric layer IN1. The material of the semiconductor layer SCL includes, for example, amorphous silicon, polysilicon, or metal oxide, such as indium gallium zinc oxide (IGZO), but not limited thereto. The semiconductor layer SCL may be a patterned semiconductor layer, and the semiconductor layer SCL may include multiple semiconductor patterns CH. The semiconductor patterns CH respectively overlap with the gates GE in the direction D3.

The conductive layer C2 is disposed on the semiconductor layer SCL and the dielectric layer IN1. For the material of the conductive layer C2, reference may be made to the material of the conductive layer C1, which will not be repeated here. The conductive layer C2 may be a patterned conductive layer, and the conductive layer C2 may include multiple sources SE, multiple drains DE, multiple data lines DL, and other lines (not shown), but not limited thereto.

As shown in FIG. 1, each source SE may be electrically connected to a corresponding data line DL. In addition, each source SE and a corresponding drain DE may be respectively located on opposite sides of a corresponding semiconductor pattern CH. The data lines DL extend, for example, along the direction D2 and are arranged along the direction D1. In the top view, as shown in FIG. 1, the data lines DL and the gate lines GL intersect each other, and the data lines DL and the gate lines GL are electrically insulated from each other through the dielectric layer IN1 (please refer to FIG. 2). The element array substrate 10 may also include multiple active elements 102. Each active element 102 includes, for example, a gate GE, a semiconductor pattern CH, a source SE, and a drain DE, but not limited thereto. In FIG. 1 and FIG. 2, a bottom gate thin film transistor is used as an example of the active element 102. However, it should be understood that the type of the active element 102 and/or the relative arrangement relationship and/or the shape of electrodes in the active element 102 may be changed according to actual requirements and are not limited to those shown in FIG. 1 and FIG. 2.

Please refer again to FIG. 2. The dielectric layer IN2 is disposed on the conductive layer C2, the semiconductor layer SCL, and the dielectric layer IN1. The dielectric layer IN2 may be a single layer or multiple layers, and for the material of the dielectric layer IN2, reference may be made to the material of the dielectric layer IN1, which will not be repeated here.

The dielectric layer IN3 is disposed on the dielectric layer IN2. The dielectric layer IN3 may be used to provide a flat surface for carrying the photosensitive elements 100. The material of the dielectric layer IN3 includes, for example, an organic insulating material, but not limited thereto. For relevant content of the organic insulating material, reference may be made to the above, which will not be repeated here.

The photosensitive elements 100 are disposed on the dielectric layer IN3. As shown in FIG. 1, the photosensitive elements 100 may be arranged in an array in the direction D1 and the direction D2. Please refer to FIG. 2 again. Each photosensitive element 100 includes, for example, a bottom electrode BE, a photosensitive structure PC, and a top electrode TE, and the bottom electrode BE, the photosensitive structure PC, and the top electrode TE are, for example sequentially stacked on the dielectric layer IN3. The bottom electrode BE is, for example, electrically connected to a corresponding drain DE through a through hole TH1 penetrating the dielectric layer IN3 and the dielectric layer IN2. The material of the bottom electrode BE may, for example, include a transparent conductive material or an opaque conductive material. The material of the top electrode TE may, for example, include a transparent conductive material, so that a light beam incident on the photosensitive element 100 may pass through the top electrode TE and be transmitted to the photosensitive structure PC. The material of the photosensitive structure PC includes, for example, silicon, germanium, indium gallium arsenide, lead sulfide, or other suitable semiconductor materials.

In FIG. 1, the area of the bottom electrode BE is greater than the area of the photosensitive structure PC and the area of the top electrode TE, and the area of the photosensitive structure PC is equal to the area of the top electrode TE, but the disclosure is not limited thereto. Optionally, the area of the bottom electrode BE may be equal to the area of the photosensitive structure PC and the area of the top electrode TE to facilitate fabrication. Optionally, the area of the bottom electrode BE, the area of the photosensitive structure PC, and the area of the top electrode TE may be changed according to actual requirements. In addition, in FIG. 1, the photosensitive elements 100 do not overlap with the gate lines GL, the data lines DL, and the active elements 102 in the direction D3, but the disclosure is not limited thereto. Optionally, the photosensitive elements 100 may overlap with the gate lines GL, the data lines DL, and/or the active elements 102 in the direction D3 to increase the area of the photosensitive elements 100, so as to improve the conversion efficiency.

The dielectric layer IN4 is disposed on the photosensitive elements 100 and the dielectric layer IN2. The dielectric layer IN4 may be used to provide a flat surface carrying the conductive layer C3 and/or the protrusions 12. The material of the dielectric layer IN4 includes, for example, an organic insulating material, but not limited thereto. The dielectric layer IN4 may include multiple openings TH2. Each opening TH2 exposes a part of the top electrode TE of a corresponding photosensitive element 100.

The conductive layer C3 is disposed on the dielectric layer IN4. For the material of the conductive layer C3, reference may be made to the material of the conductive layer C1, which will not be repeated here. The conductive layer C3 may be a patterned conductive layer, and the conductive layer C3 may include multiple bias lines BL and other lines (not shown), but not limited thereto.

Each bias line BL is, for example, electrically connected to a corresponding top electrode TE through a corresponding opening TH2. As shown in FIG. 1, the bias lines BL, for example, extend along the direction D2 and are arranged along the direction D1. In addition, the bias lines BL and the data lines DL are, for example, alternately arranged in the direction D1.

It should be understood that the element array substrate 10 in FIG. 2 is only an example and is not intended to limit the implementation aspect of the element array substrate 10. For example, although not shown, the source SE, the drain DE, and/or the data line DL may include multiple conductive layers. In other embodiments, there may be another conductive layer (not shown) between the second conductive layer C2 and the bottom electrode BE, and a conductive pattern or a wiring structure (not shown) for electrically connecting the drain DE and the bottom electrode BE in the another conductive layer may be regarded as a part of the drain DE. Similarly, a conductive pattern or a wiring structure (not shown) electrically connected to the source SE in the another conductive layer may be regarded as a part of the source SE.

The protrusions 12 are disposed on the conductive layer C3 and the dielectric layer IN4. The material of the protrusions 12 may be a transparent material with a light transmittance of greater than 70%, such as a transparent material with a light transmittance of greater than 98% or 99%, but not limited thereto. For example, the material of the protrusions 12 may be a transparent organic polymer material, such as polymethylmethacrylate, epoxy, acrylic-based resin, silicone, polyimide polymer, PFA, a positive photosensitive material, a negative photosensitive material, or a combination of the above, but not limited thereto.

In some embodiments, a thickness T12 of the protrusions 12 is, for example, greater than 0.5 μm and less than 30 μm. As shown in FIG. 1, the protrusions 12 and the photosensitive elements 100 may be arranged in a one-to-one relationship. In the top view, the area of at least one of the protrusions 12 may be greater than or smaller than the area of at least one of the photosensitive elements 100. Taking FIG. 1 as an example, the areas of the protrusions 12 are respectively greater than the areas of the photosensitive elements 100, and each protrusion 12 covers, for example, a corresponding photosensitive element 100 and a corresponding active element 102, but not limited thereto. In some embodiments, the area of at least one of the protrusions 12 may be 0.7 to 1.3 times the area of at least one of the photosensitive elements 100.

In some embodiments, a gap of the protrusions 12 is, for example, greater than 1 μm. Taking FIG. 1 as an example, the protrusions 12 may have a gap IT1 in the direction D1, and the protrusions 12 may have a gap IT2 in the direction D2. The gap IT1 and the gap IT2 are, for example, greater than 1 μm. The gap IT1 and the gap IT2 may be the same or different. In some embodiments, the gap IT1 is, for example, greater than the gap IT2, but not limited thereto.

The scintillator layer 14 is, for example, a columnar crystal scintillator layer. As shown in FIG. 2, the scintillator layer 14 may have an optical fiber-like structure 140. The material of the scintillator layer 14 includes, for example, cesium iodide (CsI), cesium bromide (CsBr), cesium copper iodine ($Cs_3Cu_2I_5$), and other types of inorganic scintillator materials or organic scintillator materials.

The protrusions 12 may have a shielding function on the material of the scintillator layer 14 when forming the scintillator layer 14, so that the scintillator layer 14 grows faster on the protrusions 12 than between two adjacent protrusions 12, thereby changing the regional density of the scintillator layer 14. As shown in FIG. 2, the scintillator layer 14 may have the first portion P1 overlapping the protrusions 12 and the second portion P2 not overlapping the protrusions 12, and the density of the first portion P1 is greater than the density of the second portion P2. For example, a density difference between the first portion P1 and the second portion P2 may be greater than or equal to 2%. If the density of the first portion P1 is 100%, the density of the second portion P2 may be 98% or less.

Furthermore, multiple fiber-like structures 140 of the scintillator layer 14, for example, extend/grow upward from the protrusions 12, wherein the gap (refer to the gap IT1 and the gap IT2 in FIG. 1) of greater than 1 μm between the protrusions 12 causes a gap G at the bottoms of two adjacent fiber-like structures 140 respectively located on two adjacent protrusions 12. As the fiber-like structures 140 grow upward, the two adjacent fiber-like structures 140 become closer to each other, that is, the gap G gradually becomes smaller. The gap G, for example, divides the scintillator layer 14 into multiple scintillator units U. As shown in FIG. 2, the scintillator layer 14 may include multiple scintillator units U (only one is marked), there is the gap G between two adjacent scintillator units U among the scintillator units U, and the gap G gradually decreases in the stacking direction (for example, the direction D3) of the element array substrate 10, the protrusions 12, and the scintillator layer 14. Since the gap G is disposed corresponding to the second portion P2 of the scintillator layer 14, and the gap G gradually decreases from bottom to top, the side (for example, the lower side) of the second portion P2 adjacent to the element array substrate 10 is looser than the side (for example, the upper side) of the second portion P2 away from the element array substrate 10.

In addition, one scintillator unit U among the scintillator units U overlaps with a corresponding protrusion 12 and has a first surface S1 adjacent to the corresponding protrusion 12 and a second surface S2 (for example, a virtual plane composed of multiple vertices of the fiber-like structures 140) away from the corresponding protrusion 12, wherein in the cross-sectional view, as shown in FIG. 2, a width W2 of the second surface S2 is greater than a width W1 of the first surface S1. In addition, the corresponding protrusion 12 has a third surface S3 adjacent to the scintillator unit U and a fourth surface S4 away from the scintillator unit U, wherein in the cross-sectional view, as shown in FIG. 2, a width W3 of the third surface S3 is less than or equal to the width W1 of the first surface S1, and the width W3 of the third surface S3 may be different from a width W4 of the fourth surface S4. For example, the width W3 may be smaller than the width W4, but not limited thereto. In other embodiments, the width W3 may be greater than or equal to the width W4.

Figure 3:
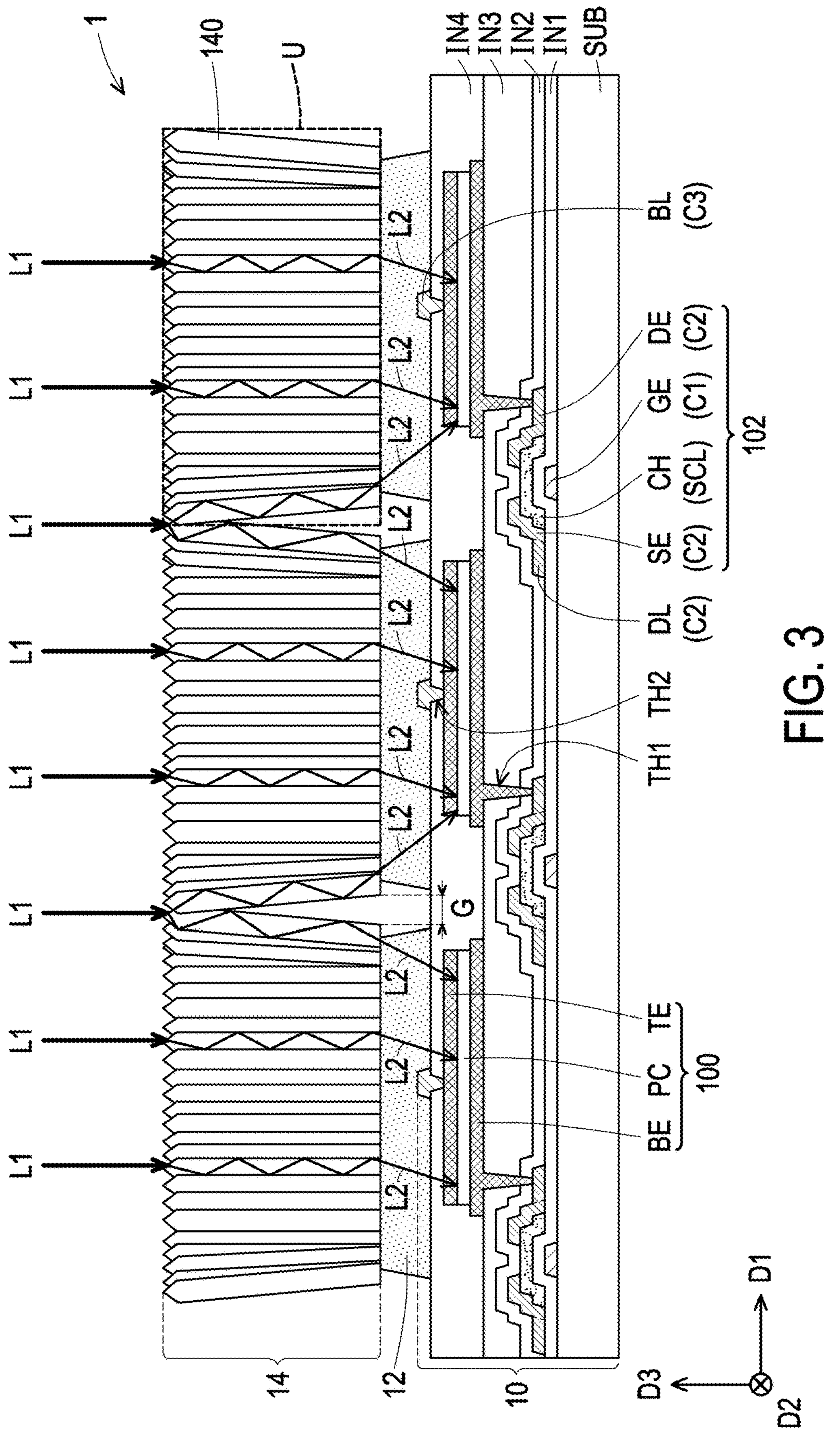
FIG. 3 is a cross-sectional schematic view corresponding to FIG. 2 and shows an electronic device irradiated by an X-ray.

FIG. 3 is a cross-sectional schematic view corresponding to FIG. 2 and shows an electronic device irradiated by an X-ray. Please refer to FIG. 3. When an electronic device 1 is irradiated by an X-ray L1, the scintillator layer 14 in the electronic device 1 converts the X-ray L1 into a visible light L2. Since the refractive index of the fiber-like structure 140 of the scintillator layer 14 is greater than the refractive index of air, the visible light L2 may be transmitted toward the photosensitive element 100 in the fiber-like structure 140 via total internal reflection (TIR). The photosensitive element 100 may receive the visible light L2 emitted from the fiber-like structure 140 and generate an image corresponding to a light intensity distribution of the visible light L2.

Through the design that the side of the second portion P2 of the scintillator layer 14 adjacent to the element array substrate 10 is looser than the side of the second portion P2 away from the element array substrate 10, the fiber-like structures 140 in the scintillator layer 14 are evenly and densely distributed on a side away from the protrusions 12 (the gap G is smaller), and the fiber-like structures 140 are concentrated on the protrusions 12 on a side adjacent to the protrusions 12, forming multiple inverted trapezoidal scintillator units U. The inverted trapezoidal scintillator unit U helps to increase the light receiving area of the scintillator layer 14. In addition, guiding the visible light L2 converted from the X-ray L1 to the corresponding photosensitive element 100 via total internal reflection helps to improve the sensitivity of imaging.

In addition, since the inverted trapezoidal scintillator units U are loosely distributed on the side adjacent to the protrusions 12 (the gap G is greater), light interference (for example, X-talk) between the scintillator units U can be reduced, which helps to improve the spatial resolution of imaging.

Figure 4:
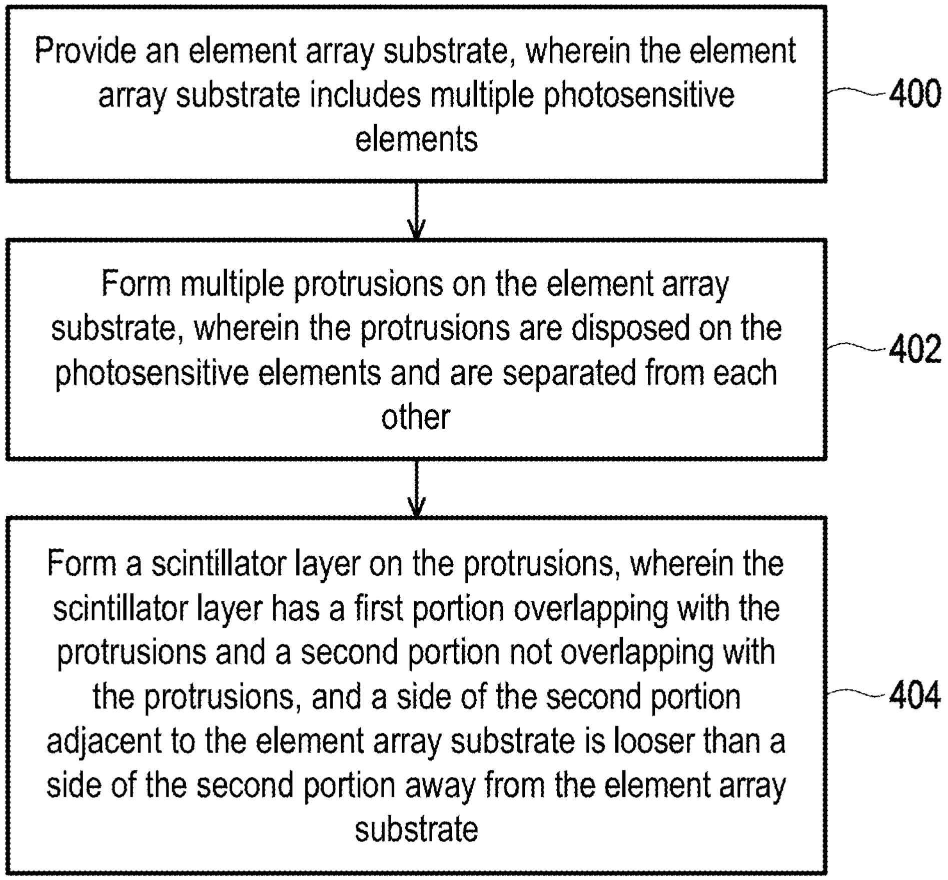
FIG. 4 is a schematic flowchart of a manufacturing method of an electronic device according to an embodiment of the disclosure.
Figure 5:
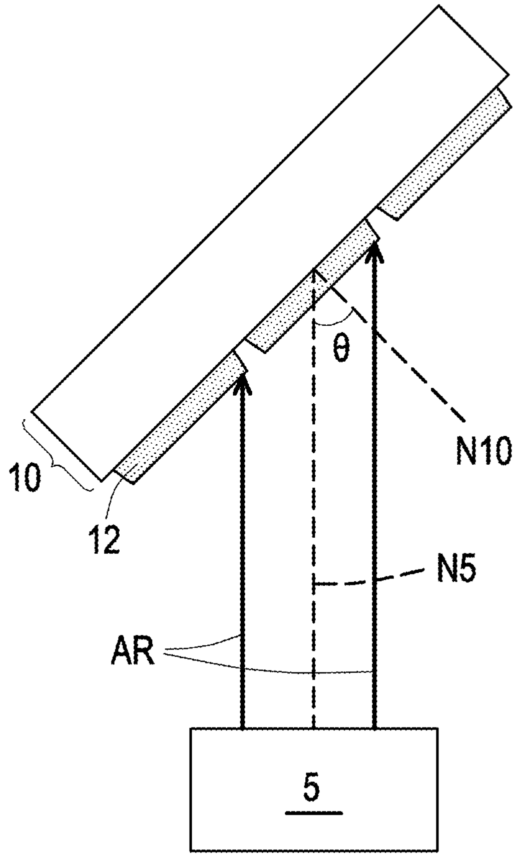
FIG. 5 is a simple schematic view of steps of forming a scintillator layer.
Figure 6:
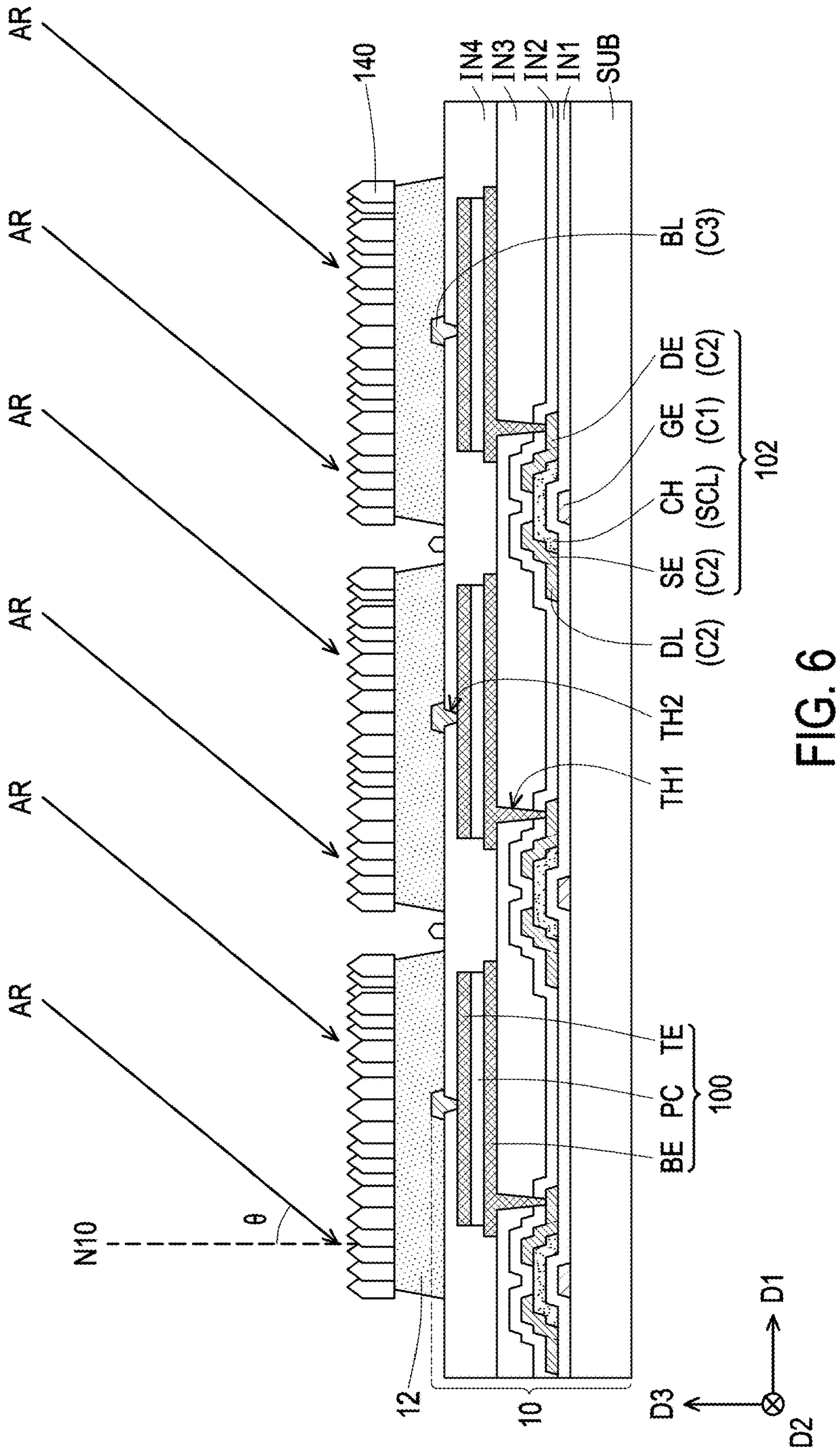
FIG. 6 is a partially enlarged schematic view of FIG. 5.

FIG. 4 is a schematic flowchart of a manufacturing method of an electronic device according to an embodiment of the disclosure. FIG. 5 is a simple schematic view of steps of forming a scintillator layer. FIG. 6 is a partially enlarged schematic view of FIG. 5. In order to facilitate viewing, the electronic device in FIG. 6 is rotated by an angle (an incident direction of the material of the scintillator layer is also rotated by the same angle), so that a placement angle of the electronic device is the same as FIG. 2.

Please refer to FIG. 2 and FIG. 4. The manufacturing method of the electronic device 1 may include: providing the element array substrate 10, wherein the element array substrate 10 includes the photosensitive elements 100 (Step 400); forming the protrusions 12 on the element array substrate 10, wherein the protrusions 12 are disposed on the photosensitive elements 100 and are separated from each other (Step 402); and forming the scintillator layer 14 on the protrusions 12, wherein the scintillator layer 14 has the first portion P1 overlapping with the protrusions 12 and the second portion P2 not overlapping with the protrusions 12, and the side of the second portion P2 adjacent to the element array substrate 10 is looser than the side of the second portion P2 away from the element array substrate 10 (Step 404).

For the detailed content of the element array substrate 10, reference may be made to the above, which will not be repeated here. In addition, the material of the protrusions 12 may be a transparent organic polymer material to save process time and/or reduce the shielding or the absorption of the visible light L2 (refer to FIG. 3) incident toward the photosensitive elements 100 by the protrusions 12. In addition, based on considerations such as process time, process limits, and/or the effectiveness of the shielding effect, the thickness T12 of the protrusions 12 is, for example, greater than 0.5 μm and less than 30 μm, so that the growth rate of the scintillator layer 14 on the protrusions 12 is faster than the growth rate between two adjacent protrusions 12.

Specifically, as shown in FIG. 5 and FIG. 6, the scintillator layer 14 is, for example, a columnar crystal scintillator layer, and a method of forming the scintillator layer 14 includes deposition. When performing deposition, the element array substrate 10 formed with the protrusions 12 is obliquely disposed above a deposition source 5, so that the material of the scintillator layer 14 is obliquely incident on the protrusions 12 and the element array substrate 10. The incident direction of the material of the scintillator layer 14 is marked with an arrow AR in FIG. 5 and FIG. 6. Oblique incidence refers to that an included angle θ between a normal N10 of the element array substrate 10 (for example, a line perpendicular to the surface of the element array substrate 10) and a normal N5 of the deposition source 5 (for example, a line perpendicular to the surface of the deposition source 5) is greater than 0.

In the design where the material of the scintillator layer 14 is obliquely incident on the protrusions 12 and the element array substrate 10, the protrusions 12 have the shielding function on the material of the obliquely incident scintillator layer 14, so that the growth rate of the scintillator layer 14 on the protrusions 12 is faster than the growth rate between two adjacent protrusions 12. FIG. 6 schematically illustrates that the fiber-like structure 140 is formed between two adjacent protrusions 12, but the growth rate of the fiber-like structure 140 between two adjacent protrusions 12 is slower than the growth rate of the fiber-like structure 140 on the protrusion 12, so the fiber-like structure 140 between two adjacent protrusions 12 is shorter than the fiber-like structure 140 on the protrusion 12, and the length difference becomes more significant as the growth time increases. As shown in FIG. 2, when the fabrication of the scintillator layer 14 is completed, the fiber-like structure 140 between two adjacent protrusions 12 is so small that the fiber-like structure 140 may be almost ignored.

The degree of shielding on the material of the obliquely incident scintillator layer 14 by the protrusions 12 during deposition can be improved through increasing the thickness T12 of the protrusions 12 and/or increasing the gap (for example, the gap IT1 and/or the gap IT2 shown in FIG. 1) between two adjacent protrusion 12. However, the process time and/or cost increases as the thickness T12 of the protrusions 12 increases, and there is a process limit for the thickness T12 of the protrusions 12. Therefore, based on considerations such as process time, process limits, and/or the effectiveness of the shielding effect, the thickness T12 of the protrusions 12 is, for example, greater than 0.5 μm and less than 30 μm. In addition, considering the loosening effect of the scintillator layer 14 on the side adjacent to the protrusions 12, the gap (for example, the gap IT1 and/or the gap IT2 shown in FIG. 1) of the protrusions 12 is, for example, greater than 1 μm.

Figure 7:
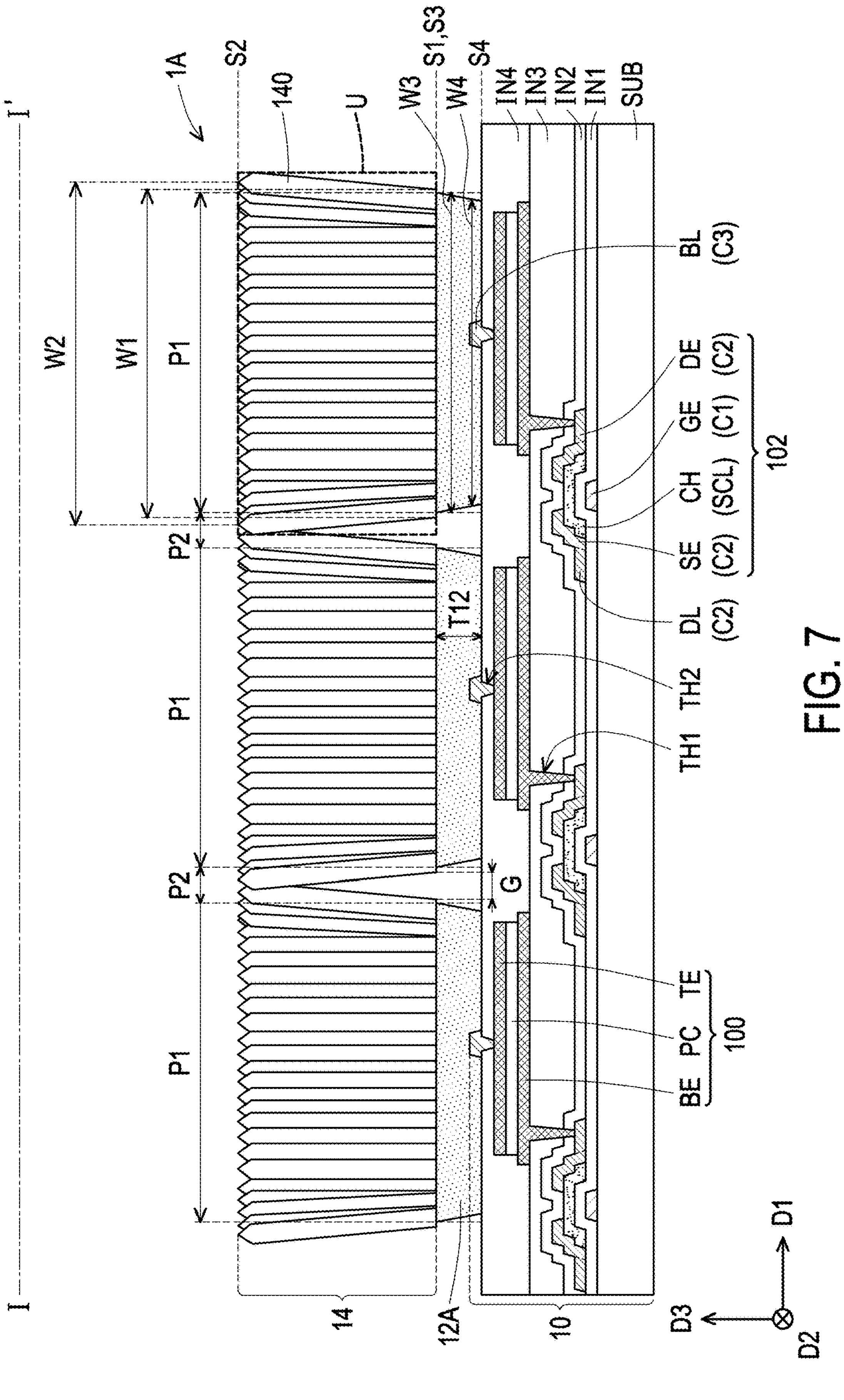
FIG. 7 is a partial cross-sectional schematic view of an electronic device according to another embodiment of the disclosure.

FIG. 7 is a partial cross-sectional schematic view of an electronic device according to another embodiment of the disclosure. Please refer to FIG. 7. The main difference between an electronic device 1A and the electronic device 1 of FIG. 2 is that the width W3 of the third surface S3 of a protrusion 12A is greater than the width W4 of the fourth surface S4. For example, the protrusions 12 in FIG. 2 are, for example, formed by patterning a positive photosensitive material, and multiple protrusions 12A in FIG. 7 are, for example, formed by patterning a negative photosensitive material, but not limited thereto.

In summary, in the embodiments of the disclosure, the spatial resolution or the sensitivity of imaging can be improved through designing the side of the second portion of the scintillator layer adjacent to the element array substrate to be looser than the side of the second portion away from the element array substrate.

The above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

Although the embodiments and the advantages of the disclosure have been disclosed above, it should be understood that any person skilled in the art may make changes, substitutions, and modifications without departing from the spirit and scope of the disclosure, and the features of the embodiments may be arbitrarily mixed and replaced to form other new embodiments. In addition, the protection scope of the disclosure is not limited to processes, machines, manufactures, material compositions, devices, methods, and steps in the specific embodiments described in the specification. Any person skilled in the art may understand conventional or future-developed processes, machines, manufactures, material compositions, devices, methods, and steps from the content of the disclosure as long as the same may implement substantially the same functions or obtain substantially the same results as the embodiments described herein when used according to the disclosure. Therefore, the protection scope of the disclosure includes the above processes, machines, manufactures, material compositions, devices, methods, and steps. In addition, each claim constitutes a separate embodiment, and the protection scope of the disclosure also includes combinations of the claims and the embodiments. The protection scope of the disclosure should be defined by the appended claims.

What is claimed is:

1. An electronic device, comprising:

an element array substrate, comprising a plurality of photosensitive elements;

a plurality of protrusions, disposed on the photosensitive elements and separated from each other; and a scintillator layer, disposed on the protrusions, wherein the scintillator layer has a first portion overlapping with the protrusions and a second portion not overlapping with the protrusions, and a side of the second portion adjacent to the element array substrate is looser than a side of the second portion away from the element array substrate.

2. The electronic device according to claim 1, wherein a material of the protrusions is a transparent material with a light transmittance of greater than 70%.

3. The electronic device according to claim 1, wherein a thickness of the protrusions is greater than 0.5 μm and less than 30 μm.

4. The electronic device according to claim 1, wherein a gap of the protrusions is greater than 1 μm.

5. The electronic device according to claim 1, wherein the element array substrate further comprises a plurality of gate lines extending along a first direction and a plurality of data lines extending along a second direction, a gap of the protrusions in the first direction overlaps with at least one of the data lines, and a gap of the protrusions in the second direction overlaps with at least one of the gate lines.

6. The electronic device according to claim 5, wherein the gap of the protrusions in the first direction is greater than the gap of the protrusions in the second direction.

7. The electronic device according to claim 1, wherein in a top view, an area of at least one of the protrusions is greater than or smaller than an area of at least one of the photosensitive elements.

8. The electronic device according to claim 1, wherein a density of the first portion is greater than a density of the second portion.

9. The electronic device according to claim 1, wherein the scintillator layer comprises a plurality of scintillator units, and the scintillator units are respectively disposed on the protrusions, wherein there is a gap between two adjacent scintillator units among the scintillator units, and the gap gradually becomes smaller in a stacking direction of the element array substrate, the protrusions, and the scintillator layer.

10. The electronic device according to claim 9, wherein one scintillator unit of the scintillator units overlaps with a corresponding protrusion and has a first surface adjacent to the corresponding protrusion and a second surface away from the corresponding protrusion, and in a cross-sectional view, a width of the second surface is greater than a width of the first surface.

11. The electronic device according to claim 10, wherein the corresponding protrusion has a third surface adjacent to the one scintillator unit and a fourth surface away from the one scintillator unit, wherein in the cross-sectional view, a width of the third surface is less than or equal to the width of the first surface, and the width of the third surface is different from a width of the fourth surface.

12. The electronic device according to claim 1, wherein the scintillator layer is a columnar crystal scintillator layer.

13. The electronic device according to claim 1, wherein the element array substrate further comprises a plurality of bias lines, the bias lines overlap with the photosensitive elements and the protrusions, and the bias lines are electrically connected to the photosensitive elements and are located between the photosensitive elements and the protrusions.

14. A manufacturing method for an electronic device, comprising:

providing an element array substrate, wherein the element array substrate comprises a plurality of photosensitive elements;

forming a plurality of protrusions on the element array substrate, wherein the protrusions are disposed on the photosensitive elements and are separated from each other; and forming a scintillator layer on the protrusions, wherein the scintillator layer has a first portion overlapping with the protrusions and a second portion not overlapping with the protrusions, and a side of the second portion adjacent to the element array substrate is looser than a side of the second portion away from the element array substrate.

15. The manufacturing method of the electronic device according to claim 14, wherein the scintillator layer is a columnar crystal scintillator layer, and a method of forming the scintillator layer comprises deposition.

16. The manufacturing method of the electronic device according to claim 15, wherein when performing the deposition, the element array substrate formed with the protrusions is obliquely disposed above a deposition source, so that a material of the scintillator layer is obliquely incident on the protrusions and the element array substrate.

17. The manufacturing method of the electronic device according to claim 14, wherein a material of the protrusions is a transparent organic polymer material.

18. The manufacturing method of the electronic device according to claim 14, wherein a thickness of the protrusions is greater than 0.5 μm and less than 30 μm, so that a growth rate of the scintillator layer on the protrusions is faster than a growth rate between two adjacent protrusions.

19. The manufacturing method of the electronic device according to claim 14, wherein a gap of the protrusions is greater than 1 μm.

20. The manufacturing method of the electronic device according to claim 14, wherein the element array substrate further comprises a plurality of gate lines extending along a first direction and a plurality of data lines extending along a second direction, a gap of the protrusions in the first direction overlaps with at least one of the data lines, and a gap of the protrusions in the second direction overlaps with at least one of the gate lines.

* * * * *